US011597028B2

(12) United States Patent
Pühringer et al.

(10) Patent No.: US 11,597,028 B2
(45) Date of Patent: Mar. 7, 2023

(54) WELDING TORCH (71) Applicant: Fronius International GmbH, Pettenbach (AT)

(72) Inventors: Stefan Pühringer, Wels-Thalheim (AT); Martin Willinger, Wels-Thalheim (AT); Josef Raxendorfer, Wels-Thalheim (AT); Klaus Oberndorfer, Wels-Thalheim (AT)

(73) Assignee: Fronius International GmbH, Pettenbach (AT)

( * ) Notice: Subject to any disclaimer, the term of this patent is extended or adjusted under 35 U.S.C. 154(b) by 503 days.

(21) Appl. No.: 16/628,382

(22) PCT Filed: Jul. 4, 2018

(86) PCT No.: PCT/EP2018/068080
§ 371 (c)(1),
(2) Date: Jan. 3, 2020

(87) PCT Pub. No.: WO2019/008028
PCT Pub. Date: Jan. 10, 2019

(65) Prior Publication Data
US 2020/0215639 A1    Jul. 9, 2020

(30) Foreign Application Priority Data

Jul. 4, 2017 (EP) .................... 17179608

(51) Int. Cl.
*B23K 9/28* (2006.01)
*B23K 9/167* (2006.01)

(52) U.S. Cl.
CPC .............. *B23K 9/285* (2013.01); *B23K 9/167* (2013.01)

(58) Field of Classification Search
CPC ........ B23K 9/167; B23K 9/285; B23K 3/085; B23K 37/003
See application file for complete search history.

(56) References Cited

U.S. PATENT DOCUMENTS 3,250,889 A    5/1966   Himmelman
3,309,492 A *  3/1967   Fields .................... B23K 9/296
                                              219/121.11
(Continued)

FOREIGN PATENT DOCUMENTS

CN    1126128 A    7/1996
CN    103600162 A  2/2014
(Continued)

OTHER PUBLICATIONS

International Search Report corresponding to international application No. PCT/EP2018/068080 dated Oct. 8, 2018 (13 pages).
(Continued)

*Primary Examiner* — Brian W Jennison
(74) *Attorney, Agent, or Firm* — Maginot, Moore & Beck, LLP (57) ABSTRACT

Clamping device (2) for clamping a non-consumable welding electrode (3) with an electrode holder (2A) which has a receiving chamber (2B) aligned in the longitudinal direction for receiving a welding electrode (3) which is insertable therein and at its front end has an end portion (2C) which widens conically towards the forward end and can be compressed by means of a clamping heat sink (2D) for holding the welding electrode (3), thus producing a large-surface cooling end face (KSF) for cooling the welding electrode (3).

14 Claims, 8 Drawing Sheets

(56) References Cited

U.S. PATENT DOCUMENTS

| | | | |
|---|---|---|---|
| 3,510,622 A | 5/1970 | Himmelman | |
| 4,508,951 A * | 4/1985 | Rehrig, Jr. | B23K 9/285 |
| | | | 219/136 |
| 5,892,199 A * | 4/1999 | Ahmed | B23K 9/167 |
| | | | 219/137 R |
| 6,078,023 A * | 6/2000 | Jones | B23K 9/323 |
| | | | 219/137.62 |
| 6,586,708 B1 * | 7/2003 | Cusick, III | B23K 9/296 |
| | | | 219/74 |

FOREIGN PATENT DOCUMENTS

| | | |
|---|---|---|
| CN | 106001861 A | 6/2016 |
| CN | 106378520 A | 2/2017 |
| DE | 10 2009 008 250 A1 | 8/2010 |
| DE | 10 2009 061 013 A1 | 9/2010 |
| DE | 10 2012 223 214 A1 | 6/2014 |
| EP | 2 008 750 A1 | 12/2008 |
| EP | 2 366 485 A1 | 9/2011 |
| FR | 201 515 A | 12/1959 |
| JP | 2002-205171 A | 7/2002 |
| JP | 2003228998 A | 8/2003 |

OTHER PUBLICATIONS

First Chinese Office Action and Search corresponding to Chinese Office Action No. 201880044731.2, dated Mar. 8, 2021 (7 pages).
Office Action corresponding to International Patent Application No. PCT/EP2018/068080, dated Jun. 24, 2019 (7 pages).

* cited by examiner

WELDING TORCH

This application is a 35 U.S.C. 371 National Stage application of PCT/EP2018/068080, filed Jul. 4, 2018, and claims priority to European Application No. EP 17179608.9 filed on Jul. 4, 2017. The entire contents of the above-mentioned patent applications are incorporated herein by reference as part of the disclosure of this U.S. application.

The invention relates to a welding torch with a clamping device for clamping and cooling a non-consumable welding electrode, in particular a tungsten electrode for TIG high-performance welding.

Non-consumable welding electrodes can be used in arc welding. Here an arc burns between the non-consumable welding electrode and a workpiece. The arc and the welding zone are conventionally protected by means of a mantle of inert gas or a gas mixture with active components. Conventional welding torches have a current contact tube fixing the welding electrode and having a clamping element for the non-consumable welding electrode. In addition, a conventional welding torch normally has an inert gas nozzle, which encloses the current contact tube and the non-consumable welding electrode. At a particular angle a filler metal wire can be applied out of which a transfer of material to the workpiece to be welded takes place. During the welding process the arc forming between the welding electrode and the workpiece is fed by an energy source which is controlled by a control device. In the case of conventional welding torches, in particular high-performance welding torches, the non-consumable welding electrode, for example a tungsten welding electrode, is pressed, soldered or bolted in rigidly into an electrode holder for fixing.

Such an electrode holder for a welding torch has the disadvantage that the non-consumable welding electrode can be replaced only with considerable technical effort or not at all. Furthermore, the welding electrode fixed inside the electrode holder is not displaceable in the longitudinal direction of the electrode holder, so that it cannot be adjusted how far the electrode tip of the wire electrode projects from the respective welding torch.

Therefore it is an object of the present invention to create a welding torch with a clamping device for clamping a non-consumable welding electrode which allows a non-consumable welding electrode to be replaced quickly and easily when required.

This object of the invention is achieved according to a first aspect by a welding torch with a clamping device for claiming a non-consumable welding electrode with the features cited in claim 1.

The welding torch according to the invention offers as an advantage that its welding electrode is efficiently cooled by means of its clamping device.

The invention also creates a clamping device, in particular for a welding torch, for clamping a non-consumable welding electrode with an electrode holder which has a receiving chamber aligned in the longitudinal direction for receiving a welding electrode insertable therein and has at its forward end an end portion which widens conically towards the forward end and can be compressed by a clamping cooling cone or clamping heat sink of the clamping device for holding the welding electrode, wherein a large-surface cooling end face is provided for cooling the welding electrode.

The clamping device according to the invention offers the advantage that the welding electrode insertable into the receiving chamber can be inserted easily and rapidly and can be replaced when required. An additional advantage of the clamping device according to the invention is present in that the position of the inserted welding electrode can be adjusted before being rigidly clamped in the longitudinal direction, by which means it is possible to adjust the free electrode end. The user therefore has a certain amount of flexibility for the welding position. In addition, the clamping device according to the invention can be operated by a user, in particular a welder, in an especially simple manner. A further advantage is that a welding electrode can be replaced without the use of tools. The replacement of a welding electrode can also be achieved without the escape of cooling fluid. Furthermore it is possible to displace an inserted welding electrode forwards for regrinding its electrode tip to enlarge the free electrode end, and once the grinding process has been completed to push it back into the receiving chamber of the electrode holder. The clamping device according to the invention thus forms a quick clamping system for a non-consumable welding electrode which is also suitable for very high electric currents. The clamping device also permits free axial displacement or fixing of the welding electrode, by which means the characteristics of the arc being produced can be altered.

In a possible development of the clamping device according to the invention the clamping heat sink in a clamped state of the clamping device can be pushed mechanically against a mantle surface of the conical end portion of the electrode holder.

In a further possible development of the clamping device according to the invention the conical end portion in the clamped state of the clamping device is pressed on to the welding electrode inserted into the receiving chamber of the electrode holder.

In a further possible development of the clamping device according to the invention the conical end portion of the electrode holder has radially arranged clamping jaws separated by means of clamping slots, said clamping jaws being provided in the clamped state of the clamping device for pressing the conical end portion of the electrode holder on to the welding electrode inserted in the receiving chamber of the electrode holder.

In a possible development the receiving chamber of the electrode holder has at its forward end a slightly narrowed clamping region which transitions into a widened receiving region. This clamping region is preferably between 4 and 10 mm in length.

In a further possible development of the clamping device according to the invention the clamping heat sink is provided for cooling a free electrode end of the welding electrode by means of a cooling fluid flowing through or flowing past the clamping heat sink.

This development offers the advantage that excellent cooling is guaranteed close to the electrode tip of the welding electrode and thus a relatively cool welding electrode is guaranteed during a high-performance welding process.

In a further possible development of the clamping device according to the invention the welding electrode inserted in the receiving chamber of the electrode holder is displaceable in a non-clamped state of the clamping device in the receiving chamber of the electrode holder for adjusting a free electrode end of the welding electrode axially or in the longitudinal direction.

In a further possible development of the clamping device according to the invention the conically widening end portion of the electrode holder has an opening angle which is in a region of 20° to 45°, in particular 30°.

In a further possible development of the clamping device according to the invention the conically widening end portion of the electrode holder has radially evenly spaced clamping jaws.

In another development of the clamping device according to the invention the conically widening end portion of the electrode holder has six radially evenly spaced clamping jaws.

In a further possible development of the clamping device according to the invention the clamping heat sink is enclosed by a gas nozzle for delivering an inert gas.

In a further possible development of the clamping device according to the invention the welding electrode is a tungsten electrode.

In a further possible development of the clamping device according to the invention the electrode holder has in the region of its rear end a thread which serves for bolting a back cap.

In a further possible development of the clamping device according to the invention the electrode holder in whose receiving chamber a welding electrode is inserted from the front, is manually pulled to the back by bolting on a back cap such that the mantle surface of the conical end portion provided at the forward end of the electrode holder is pushed against a corresponding conical opening of the clamping cooling cone, wherein based on the clamping slots present in the end portion of the electrode holder the clamping jaws of the end portion of the electrode holder are pressed against the welding electrode inserted in the receiving chamber of the electrode holder in order to hold the welding electrode centrally.

In a further possible development of the clamping device according to the invention the clamping heat sink has a fluid chamber through which the cooling fluid flows and which is delimited by sealing rings, said fluid chamber enclosing in a clamped state of the clamping device the conical end portion of the electrode holder for cooling the free end of the welding electrode inserted therein.

In a further possible development of the clamping device according to the invention the clamping heat sink enclosing the electrode holder has a conical opening which encloses the mantle surface of the end portion of the electrode holder and has a corresponding opening angle.

The invention creates a welding torch with an inner tube enclosed by an outer tube, and with a clamping device for clamping a non-consumable welding electrode, wherein the clamping device has an electrode holder which has a receiving chamber aligned in the longitudinal direction for receiving a welding electrode insertable therein and at its forward end has an end portion which widens conically towards the forward end and can be compressed by a clamping heat sink of the clamping device for holding the welding electrode, wherein a large-surface cooling end face is provided for cooling the welding electrode.

In addition, possible developments of the clamping device according to the invention and of the welding torch according to the invention are explained in more detail by reference to the attached figures.

These Show.

Figure 1:
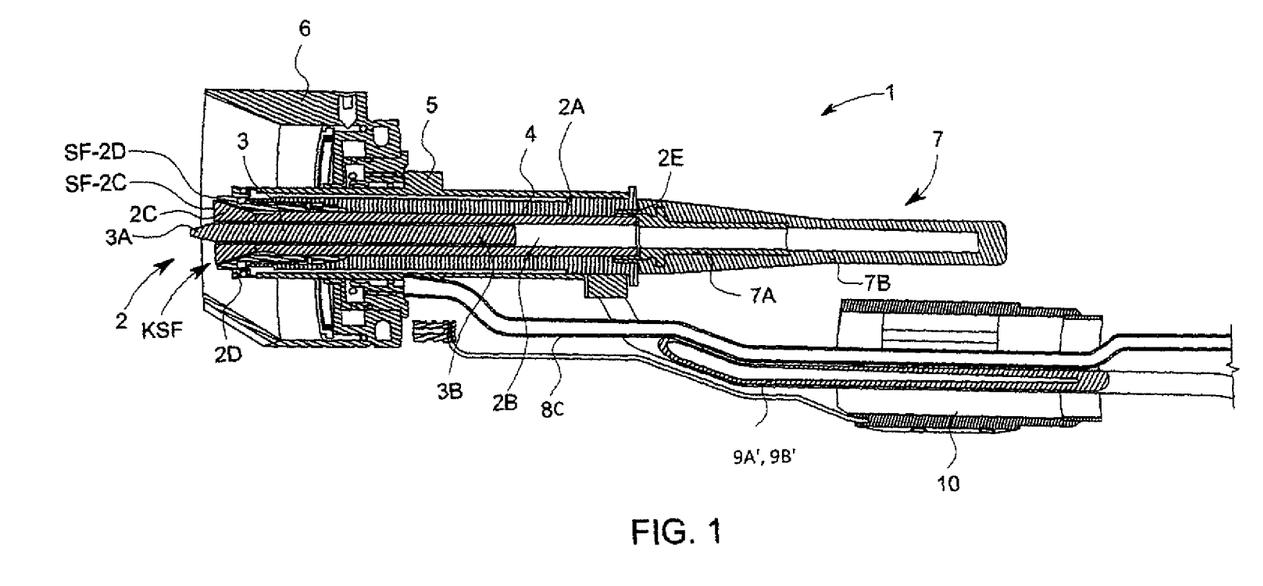
FIG. 1 a sectional view through a possible embodiment of a welding torch according to the invention, which has a clamping device for clamping a non-consumable welding electrode according to an aspect of the present invention.
Figure 5:
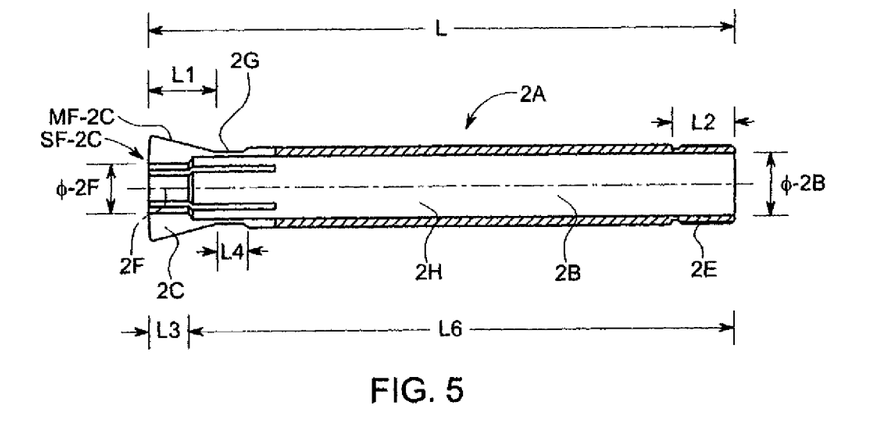
FIG. 5 a sectional view through the electrode holder shown in FIG. 4.

FIG. 1 shows an embodiment of a welding torch 1 which has a clamping device 2 according to the invention for clamping a non-consumable welding electrode 3. The non-consumable welding electrode 3 is for example a tungsten welding electrode. FIG. 1 shows a sectional view through the welding torch 1. The non-consumable welding electrode 3 is held by means of the clamping device 2. As can be seen in the sectional view shown in FIG. 3, the clamping device 2 has an electrode holder 2A which has a substantially cylindrical hollow receiving chamber 2B aligned in the longitudinal direction for receiving the welding electrode 3 which can be inserted therein. The bore or receiving chamber 2B preferably does not have a set diameter. The diameter of the bore is slightly smaller in the forward region or clamping region 2F (length L3) than in the rear region 2H (length L6) of the electrode holder 2A, as is visible in the sectional view according to FIG. 5. The clamping of the welding electrode 3 is effected thereby only in the forward clamping region 2F, so that particularly good cooling is achieved there. The electrode holder 2A has at its forward end an end portion 2C. This end portion 2C continuously widens conically to the front and has a mantle surface MF-2C as well as an annular end face SF-2C, which together with an annular end face SF-2D of a clamping heat sink 2D enclosing them forms a large-surface cooling end face KSF of the welding electrode 3 in the clamped state of the clamping device 2. In addition to the electrode holder 2A, the clamping device 2 has the clamping heat sink 2D shown in FIG. 1. The clamping heat sink 2D has a conical opening 2D-OFF which encloses the conical end portion 2C of the electrode holder 2A, as shown in the sectional view of FIG. 1. The end portion 2C of the electrode holder 2A which widens conically to the front is compressible by means of the clamping heat sink 2D for holding the welding electrode 3. The clamping heat sink 2D in a clamped state of the clamping device 2 of the welding torch 1 is pushed manually against a mantle surface MF-2C of the conical end portion 2C of the electrode holder 2A, as shown in the sectional view according to FIG. 1. The electrode holder 2A in the clamped state rigidly holds the welding electrode 3 centrally and has a large-surface cooling end face KSF, which is provided by the end faces of the compressed clamping jaws SB shown in FIG. 7 and the annular end face SF-2D of the cooling clamping cone 2D enclosing and compressing the clamping jaws SB. The welding electrode 3, for example a tungsten welding electrode, is a non-consumable electrode, which is not consumed during the welding process. As shown in the sectional view according to FIG. 1, the welding electrode 3 is preferably cylindrical like a rod and has an electrode tip 3A at the front. The cylindrically formed body 3B of the welding electrode 3 can be inserted inside the cylindrical receiving chamber 2B of the electrode holder 2A from the front in a non-clamped state of the clamping device 2 through the clamping region 2F and is axially displaceable before clamping tight. In the non-clamped state the free end of the non-consumable welding electrode 3 can thus still be adjusted or aligned manually. By this means it is determined how far the electrode tip 3A of the welding electrode 3 projects forward from the welding torch 1 for the welding process. In a possible embodiment, the conically widening end portion 2C of the electrode holder 2A has an opening angle α in a range of 20° to 45°, preferably about 30°. The heat sink 2D preferably has a corresponding conical opening at the front with a corresponding opening angle of 20° to 45°. The clamping cooling cone or clamping heat sink 2D serves to cool the free electrode end of the welding electrode 3 by means of a cooling fluid flowing through or past the heat sink 2D. In a possible embodiment the conically widening end portion 2C of the electrode holder 2A has radially evenly spaced clamping jaws SB which are separated by means of clamping slots SS. In a possible embodiment, the conically widening end portion 2C of the electrode holder 2A has six radially evenly spaced clamping slots SS, as shown in FIG. 7 for example.

Figure 7:
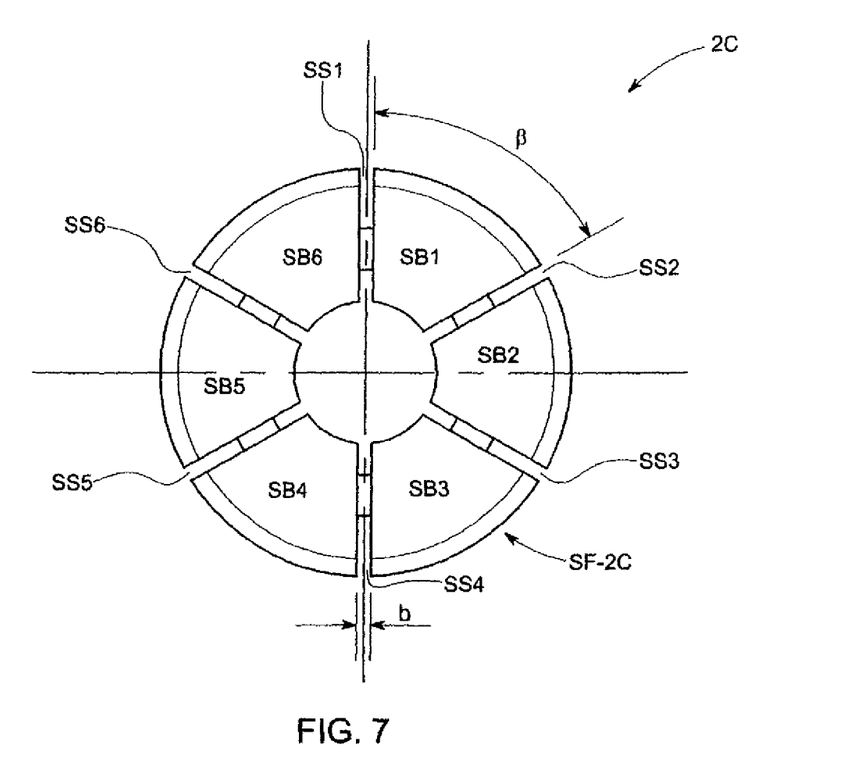
FIG. 7 a view of an end face of an end portion of the electrode holder shown from the front in FIG. 4.
Figure 9:
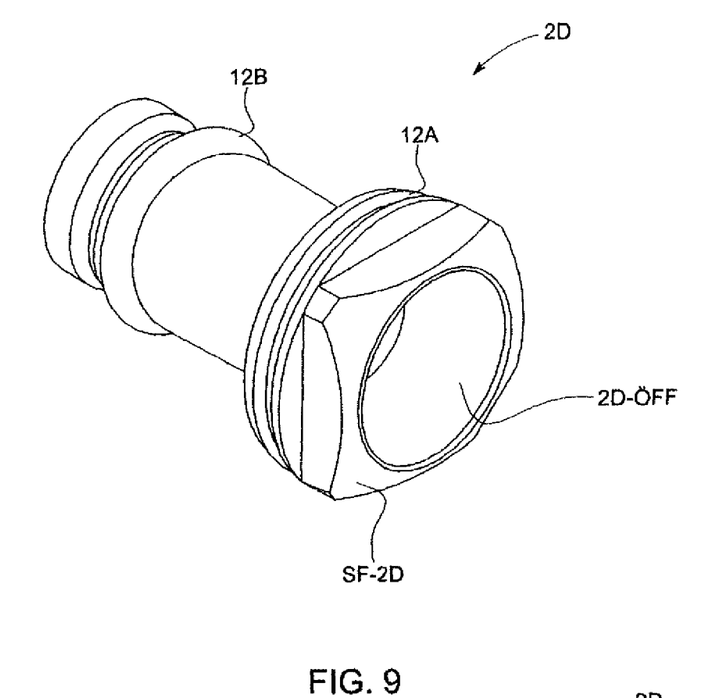
FIG. 9 a perspective view of an embodiment of a clamping heat sink used in the clamping device according to the invention.
Figure 12:
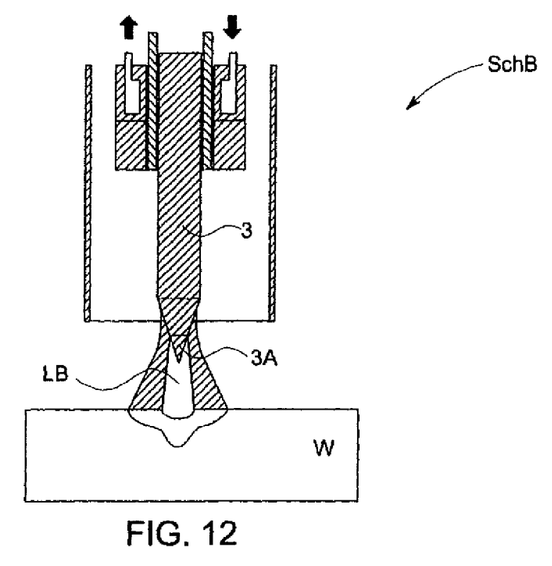
FIG. 12 a corresponding schematic sectional view through a conventional welding torch with a conventional cooling system.

FIG. 7 shows a front end face or the end face SF-2C of the end portion 2C of the electrode holder 2A, which ends at a forward end face SF-2D of the clamping cooling cone 2D shown in FIG. 9, as can be seen in FIG. 12. This promotes cooling in the region of the clamping of the welding electrode 3. In the clamped state, the end face SF-2C of the end portion 2C forms a plane with the end face SF-2C of the conical end portion 2C. The end face SF-2D of the cooling cone 2D is annular and encloses the also annular end face SF-2C of the end portion 2C, as is visible in FIG. 2.

Figure 8:
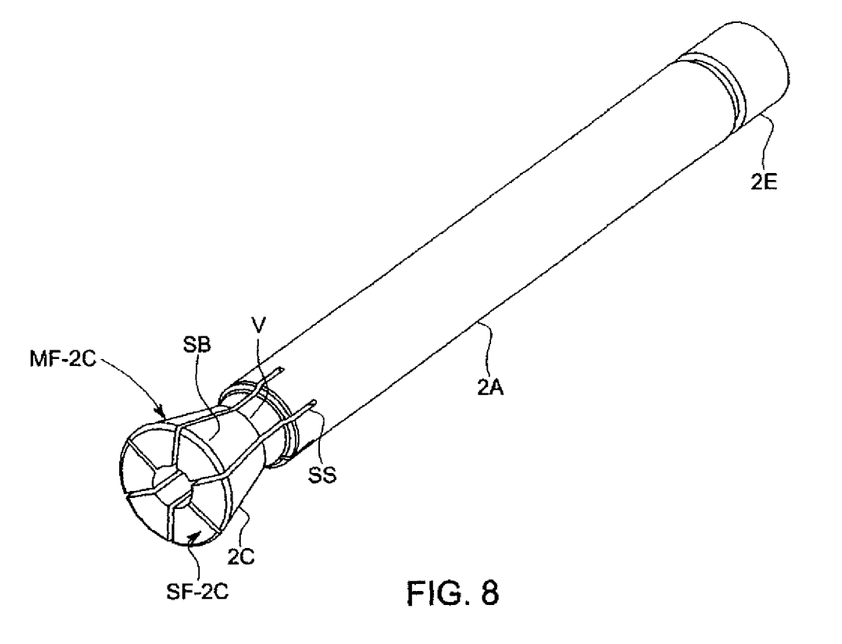
FIG. 8 a perspective view of the electrode holder shown in FIG. 4.

The conical end portion 2C of the electrode holder 2A has radially arranged clamping slots SS which in the clamped state of the clamping device 2 are provided for pressing clamping jaws or clamping jaws SB of the conical end portion 2C of the electrode holder 2A on to the welding electrode 3 inserted into the receiving chamber 2B of the electrode holder 2A. The clamping jaws SB preferably have tapering or narrowing so that they can be easily compressed, as shown in FIG. 8. The end faces of the clamping jaws SB1 to SB6 together form the slotted end face SF-2C of the end portion 2C, as shown in FIG. 7. The end face SF-2C is as large as possible in order to guarantee especially good cooling of the welding electrode 3. The annular end face SF-2C of the end portion 2C in the clamped state of the clamping device 2 is rigidly or seamlessly enclosed by the also annular end face SF-2D of the heat sink 2D pressed against it, by which means an especially large cooling end face KSF is produced which comprises both end faces SF-2C, SF-2D (KSF=SF-2C+SF-2D).

In the embodiment shown in FIG. 1, the electrode holder 2A is provided in an inner tube 4 of the welding torch 1. In a possible embodiment the inner tube 4 additionally has cooling means. The cooling means are for example provided by cooling ribs or by means of cooling channels through which a cooling medium flows. In the embodiment shown in FIG. 1 the inner tube 4 is enclosed by an outer tube 5. The clamping heat sink 2D in the embodiment shown in FIG. 1 is inserted into or bolted to the inner tube 4 of the welding torch 1. In the embodiment shown in FIG. 1 the outer tube 5 of the welding torch 1 with the clamping heat sink 2D situated therein is enclosed by a gas nozzle 6. The gas nozzle 6 serves to deliver an inert gas. At its rear end the electrode holder 2A has a fastening means for attaching a back cap 7. In a possible embodiment the electrode holder 2A has at its rear end a thread 2E for bolting on the back cap 7. In the embodiment shown in FIG. 1 the back cap 7 has for example a core 7A consisting of copper and a handle 7B consisting of plastics. In the sectional view according to FIG. 1, at the rear end of the electrode holder 2A an external thread 2E can be seen on to which an internal thread of the copper core 7A of the back cap 7 can be bolted in order to adjust a contact force of the clamping jaws SB. The electrode holder 2A, in whose cylindrical receiving bore or receiving chamber 2B the welding electrode 3 is inserted or pushed from the front through the clamping region 2D, can be pulled to the back by bolting on the back cap 7 attached to the electrode holder 2A. For example, the plastic handle 7B of the back cap 7 is rotated manually by a user in order to pull the electrode holder 2A to the back. By this means the mantle surface MF-2C of the conically widening end portion 2C provided at the forward end of the electrode holder 2A can be pushed into the corresponding conical opening of the clamping heat sink 2D. Because of the clamping slots SS present in the end portion 2C of the electrode holder 2A the clamping jaws SB of the end portion 2C of the electrode holder 2A are pressed at the front in the clamping region 2F against the welding electrode 3 inserted in the receiving chamber 2B of the electrode holder 2A, in order to rigidly hold the welding electrode 3 centrally in the clamped state. The clamping heat sink 2D which encloses the mantle surface MF-2C of the end portion 2C of the electrode holder 2A has a corresponding opening angle α, wherein because of the existing radially arranged clamping slots SS the pressure jaws or clamping jaws SB of the end portion 2C are pressed against the outer surface of the body 3B of the welding electrode 3 in order, in the clamped state of the clamping device 2, to rigidly fix the welding electrode 3 centrally. In the clamped state the welding electrode 3 can no longer be displaced laterally or axially. With the aid of the clamping heat sink 2D, in the clamped state high mechanical pressure is exerted at the front in the clamping region 2F on to the contact surface or mantle surface of the cylindrical welding electrode 3. By means of the cooled flanks of the electrode holder 2A or collet 2A at the forward end of the wire electrode 2A an overheating of the welding electrode 3 and a higher energy density of the produced arc LB are achieved. Through the mechanical contact of the welding electrode 3 applied at the foremost point a higher load can be placed on the welding electrode 3. The collet or the electrode holder 2A permit in a non-clamped state the free axial displacement or adjustment of the position of the welding electrode 3, by which means a characteristic of the arc LB can be altered. The collet or the electrode holder 2A is pressed on to the welding electrode 3 in the clamped state of the clamping device 2 by means of the water-cooled counter-rotating clamping heat sink 2D shortly behind the electrode tip 3A in the clamping region 2F with high mechanical contact forces. This guarantees excellent cooling close to the electrode tip 3A of the welding electrode 3, making it possible to keep the welding electrode 3 relatively cool during the high-performance welding process. In the non-clamped state, the welding electrode 3 may be displaced laterally in the longitudinal direction inside the cylindrical cavity or receiving chamber 2B in order to determine how far the electrode tip 3A of the welding electrode 3 projects or protrudes forwards from the welding torch 1. By setting the position of the welding electrode 3 the welding characteristics of the welding process can be influenced.

Figure 3:
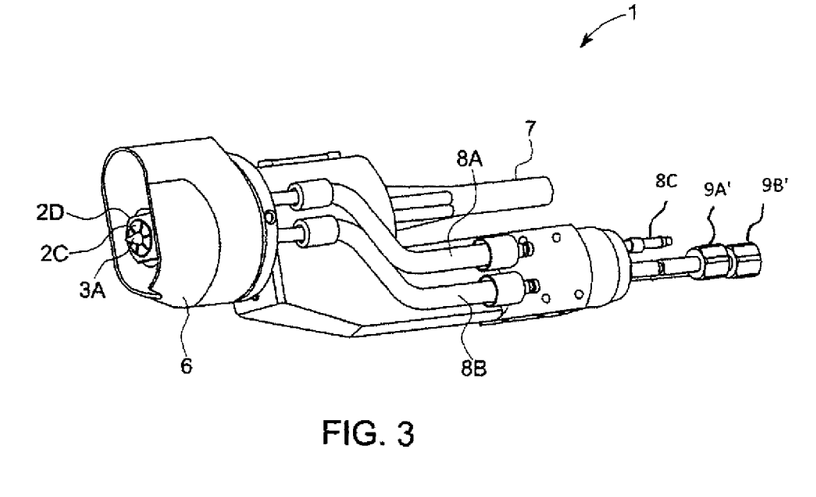
FIG. 3 a further perspective view of the welding torch shown as a sectional view in FIG. 1.

The clamping device 2 according to the invention is suitable in particular for TIG high-performance welding. During the welding process the gas nozzle 6 delivers inert gas which forms a protective mantle around the arc LB and the welding zone. This inert gas is delivered via a gas line 8C to the gas nozzle 6 in the embodiment shown in FIG. 1. The clamping cooling cone 2D preferably has a cooling fluid flowing through it. Suitable liquid coolants are, for example, water-alcohol mixtures. The clamping heat sink 2D preferably has a fluid chamber 11 through which the cooling fluid flows and which is delimited by sealing rings 12A, 12B, said clamping heat sink 2D in a clamped state of the clamping device 2 enclosing the conical end portion 2C of the electrode holder 2A for cooling the free end of the welding electrode 3 inserted therein. By this means a high cooling capacity can be achieved and a required temperature stability obtained. Through the cooling the welding process becomes more stable. For cooling the welding electrode 3 a heat exchanger may be used. In the embodiment shown in FIG. 1 a cooling medium is delivered to and discharged from the welding torch 1 via lines 9A', 9B'. A fixing device 10 fixes the gas line 8C and the cooling lines 9A', 9B'. Also the gas nozzle 6 is preferably water-cooled, in particular by means of cooling lines 8A, 8B as shown in FIG. 3. The welding torch 1 has externally laid cooling lines which lead direct to a heat exchanger. The increased cooling capacity serves to prevent overheating of the welding electrode 3, by which means the service life is lengthened and ignition is improved.

Figure 2:
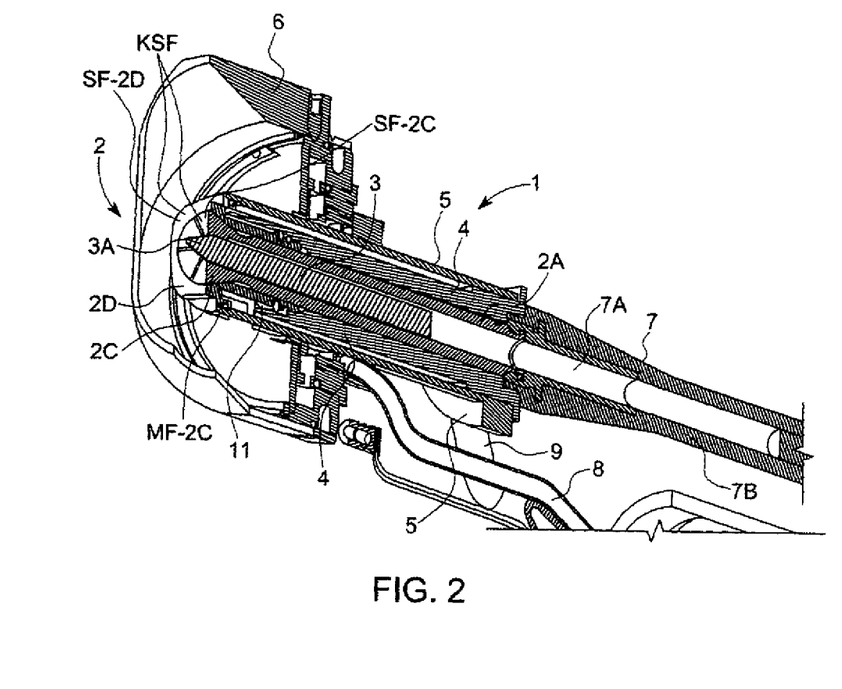
FIG. 2 a perspective sectional view of the welding torch shown in FIG. 1.

FIG. 2 shows the welding torch 1 shown in FIG. 1 in sectional view and perspectively from the front. The welding torch 1 preferably has a closed cooling circuit for cooling the welding electrode 3 during the welding process. The welding torch 1 has a delivery cooling line for delivering a cooling medium and a discharge line for discharging the cooling medium. The cooling medium or cooling fluid is introduced at a rear end of the clamping device 2 which comprises an electrode holder 2A with end portion 2C and a heat sink 2D. The cooling medium moves forwards in a delivery channel between the inner tube 4 and the outer tube 5 into a fluid chamber 11 which encloses the clamping heat sink 2D or is integrated into the clamping heat sink 2D. The warmth or heat arising during welding is thus removed from the welding electrode 3 with the help of the clamping heat sink 2D which is continuously cooled by means of the cooling fluid. In the embodiment shown in FIG. 2 the cooling fluid is delivered to the fluid chamber 11 on an underside of the welding torch 1 and wanders on an upper side of the welding torch 1 between the inner tube 4 and the outer tube 5 to the back where it is returned to the heat exchanger via a discharge line.

Figure 11:
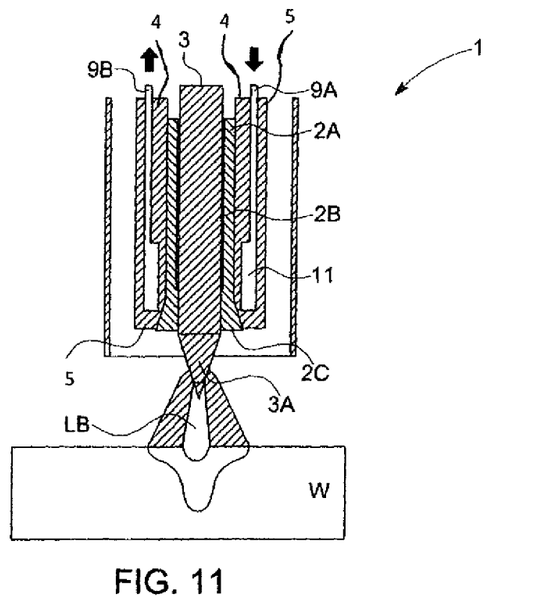
FIG. 11 a schematic sectional view through an example embodiment of a welding torch according to the invention showing the cooling system provided therein.

The cooling provided in a preferred embodiment of the clamping device 2 according to the invention is also shown schematically in FIG. 11. The welding torch 1 has a clamping device 2 according to the invention with a welding electrode 3 rigidly clamped therein, at whose tip an arc LB is produced during the welding process. The arc LB reaches between the tip 3A of the welding electrode 3, for example a tungsten welding electrode, and a workpiece W to be welded. The cooling medium is delivered via a cooling fluid delivery line 9A and led forward to the cooling fluid chamber 11. The cooling medium which has been heated by the welding process is then discharged again to the back from the fluid chamber 11 via a cooling fluid discharge line 9B.

The inner cooling fluid delivery line 9A and the inner cooling fluid discharge line 9B are located between the inner tube 4 and the outer tube 5 of the welding torch 1. The cooling fluid delivery line 9A is connected to the cooling fluid connection line 9A' and the inner cooling fluid discharge line 9B is connected to the cooling fluid connection line 9B' according to FIGS. 1, 3.

For comparison, FIG. 12 shows schematically the structure of a conventional welding torch SchB. Also in the conventional welding torch SchB a cooling medium is delivered via a delivery line and discharged via a discharge line. However, in the welding torch 1 according to the invention the cooling fluid chamber 11 is further forward, in the immediate vicinity of the tip 3A of the welding electrode 3, whilst the cooling fluid chamber in the case of a conventional welding torch SchB is further back on the body 3B of the welding electrode 3, as shown in FIG. 12.

With the help of the cooling circuit shown in FIG. 11, which is provided in the case of the clamping device 2 according to the invention, an especially high electric current I can be applied to the welding electrode 3, whereby a overheating of the welding electrode 3 is prevented with the aid of the cooling fluid, which is located in direct proximity to the welding electrode tip 3A. By this means a higher energy density of the arc LB can be achieved. The welding torch 1 according to the invention with the clamping device 2 can, for example, be used for high-performance TIG welding with a current of over 300 A. In a possible embodiment the fluid chamber 11 can be limited by two sealing rings 12A, 12B, as can be seen in FIG. 9. In the embodiment shown, the clamping device 2 according to the invention thus has a clamping heat sink 2D with a fluid chamber 11 adjacent thereto, delimited by two sealing rings 12A, 12B and which in a clamped state of the clamping device 2 cools the conical end portion 2C of the electrode holder 2A which in turn cools a free end of the welding electrode 3 inserted therein.

FIG. 3 shows a perspective view of the welding torch 1 shown in FIGS. 1, 2. In FIG. 3 the gas nozzle 6 which encloses the clamping device 2 can be seen. The gas nozzle 6 is shown oval-shaped in the embodiment. The oval-shaped opening of the gas nozzle 6 corresponds to the welding direction of the welding torch 1 along the surface of the workpiece W to be welded. In the embodiment shown, the welding torch 1 has lines 8A, 8B for water cooling the gas nozzle 6. The inert gas is delivered to the gas nozzle 6 via the connection line 8C. In FIG. 3, the electrode tip 3A of the welding electrode 3 can be seen which projects in the clamped state of the clamping device 2 from the end face of the pressed on end portion 2C of the electrode holder 2A. The connection lines 9A', 9B' form a delivery line and a discharge line for the cooling medium for cooling the welding electrode 3 and are connected to the inner delivery and discharge lines 9A, 9B shown in FIG. 11.

Figure 4:
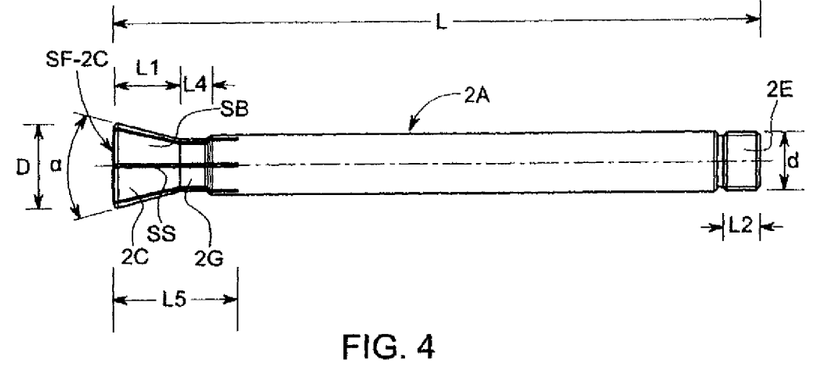
FIG. 4 an embodiment of an electrode holder provided in the clamping device according to the invention.
Figure 6:
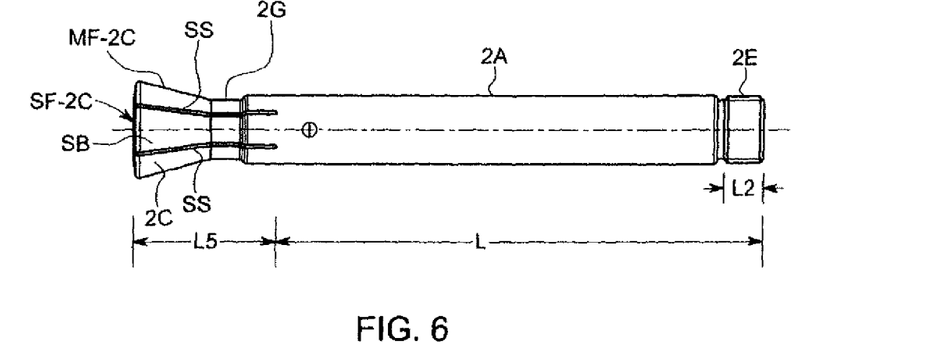
FIG. 6 an additional view of the electrode holder shown in FIG. 4.

FIG. 4 shows an embodiment of an electrode holder 2A which can be used with the clamping device 2 according to the invention. The electrode holder 2A has a continuous almost cylindrical receiving opening or receiving chamber 2B with a diameter ø-2B, as shown in the sectional view in FIG. 5. In a forward clamping region 2F with a length L3 the receiving chamber 2B has a slightly smaller diameter ø-2F than the rest of the receiving chamber 2B (ø-2F<ø-2B). In addition, the electrode holder 2A on its forward side has a conically widening end portion 2C. The end portion 2C shown in section forms the body of an equilateral triangle, whose base is the end face SF-2C which is enclosed by the end face SF-2D of the clamping heat sink 2D. The electrode holder 2A has a total length L in the embodiment shown. At the rear end the electrode holder 2A has a thread 2E with a length L2 for bolting the back cap 7 on. In the embodiment shown, the conically widening end portion 2C has a length L1. To this is connected a tapered portion 2G with a length L4. The end portion 2C has radially arranged clamping slots SS which extend through the tapered portion 2G and have a length L5, as shown in FIG. 4. The outer thread 2E at the rear end of the electrode holder 2A has a length L2 in the embodiment shown. The electrode holder 2A has at the back an outer diameter d, as shown in FIG. 4. The conical end portion 2C widens to an outer diameter D, as shown in FIG. 4. For this the end portion 2C has, for example, an opening angle $\alpha$ of 30°. The end portion 2C has radially arranged clamping slots SS. As shown in FIG. 7, the electrode holder 2A or its end portion 2C has in the embodiment shown six radially arranged clamping slots SS1 to SS6, which are spaced apart at an offset angle $\beta(\beta=60°)$. The even spacing of the clamping slots SS permits accurate centring by means of the clamping jaws SB of the clamped welding electrode 3. The end portion 2C preferably has at least three evenly spaced clamping slots SS. FIG. 6 shows the electrode holder 2A rotated in FIG. 4.

Additionally, FIG. 8 shows the electrode holder 2A perspectively. The length L of the electrode holder 2A can vary depending on the particular application. The inner diameter ø-2F of the receiving chamber 2B corresponds in the clamping region 2F to the outer diameter ø-SE of the welding electrode 3 (ø-2F=ø-SE) which can be inserted into it.

Figure 10:
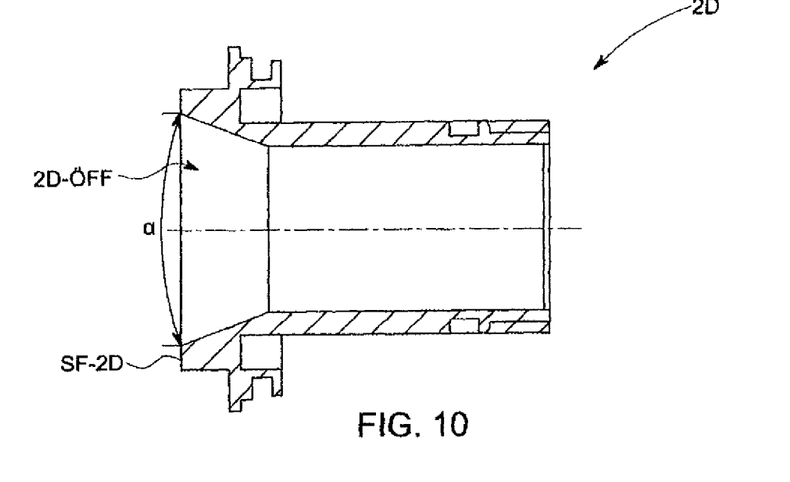
FIG. 10 a sectional view through the clamping heat sink shown in FIG. 9.

FIG. 9 shows perspectively an embodiment for a clamping heat sink 2D which can be used with the clamping device 2 according to the invention. FIG. 10 shows a sectional view through the clamping heat sink 2D shown in FIG. 9. The clamping heat sink 2D has at the front a conical opening 2D-OFF, whose opening angle matches the opening angle $\alpha$ of the end portion 2C. The clamping heat sink 2D is preferably inserted into a forward end of the inner tube 4 and screwed in there. For this the clamping heat sink 2D may have a corresponding thread at its rear end. In a possible embodiment the clamping heat sink 2D comprises thermally conductive copper which is preferably silver-plated. As can be seen from FIG. 9, a fluid chamber 11 is limited for the cooling fluid by two sealing rings 12A, 12B which cools the welding electrode 3 inserted in the electrode holder 2A. It is possible to replace the welding electrode 3 without the cooling fluid escaping. An additional advantage is that the welding electrode 3 can be replaced without unbolting and re-bolting the electrode holder 2A, i.e. during assembly the welding electrode 3 is inserted into the clamping device 2 without the electrode holder. When removing the welding electrode 3, the electrode holder 2A remains in the clamping device 2 for receiving the next welding electrode 3. With the clamping device 2 according to the invention, the welding electrode 3 can be clamped flat rigidly with the aid of the clamping jaws or clamping jaws SB provided between the connections SS. The quick clamping device 2 permits simple clamping and replacement of the welding electrode 3. The replaceable welding electrode 2 itself does not require an electrode holder, but is inserted into the electrode holder 2A of the clamping device 2.

In a possible embodiment, the welding torch 1 can be attached to a robot arm on a welding set. Alternatively the welding torch 1 may be a manually held welding torch. The welding electrode 3 can be easily accessed from the front for replacement or adjustment, so that handling the welding torch 1 is simplified. This permits the welding electrode tip 3A to be reground. The welding torch 1 with the clamping device 2 according to the invention offers maximum arc quality and high ignition safety. As a result of good cooling, the welding electrodes 3 employed can be subjected to less stress and used for longer. Therefore the welding torch 1 according to the invention is particularly sparing of resources. Since the electrode holder 2D remains in the clamping device 2 when replacing a welding electrode, the welding electrode can be assembled particularly simply and rapidly.

Further embodiments are possible. In the embodiment shown in FIG. 1 the welding electrode 3 is introduced from the front and clamped for the welding process by mechanically pulling the electrode holder 2A backwards. In an alternative embodiment the welding electrode 3 is introduced from the back into the electrode holder 2A by means of a corresponding opening. In a further alternative embodiment several welding electrodes 3 can be held in reserve by stacking them on top of one another inside the receiving chamber 2B of the electrode holder 2A. In this embodiment a used welding electrode 3 is removed from the welding torch 1 at the front and the next welding electrode 3 located inside the receiving chamber 2B is guided or pushed forward for the further welding process. In this embodiment two or more welding electrodes 3 may for example be located inside the receiving chamber 2B of the electrode holder 2A and when needed can be guided forward one after another. In this embodiment the receiving chamber 2B serves as the storage chamber or magazine for a group of welding electrodes 3 therein which can be used consecutively.

In a further possible alternative embodiment the positioning of the welding electrode 3 is not achieved manually by axial or longitudinal displacement, but takes place automatically with the help of an actuator. In a further possible embodiment the length, with which the free end or the electrode tip 3A projects from the conical end portion 2C of the welding torch 1 can be accurately adjusted automatically with the help of an actuator. In a further possible embodiment this can also be done during the welding process to influence the arc LB. Simultaneously the shielding inert gas which flows from the gas nozzle 6 can be regulated. In a further possible embodiment of the welding torch 1 according to the invention, the cooling rate at which the cooling medium flows through the clamping device 2, or past it, can be set or regulated. In a further possible embodiment the temperature T of the welding electrode 3 is constantly monitored by sensors. If the temperature of the welding electrode 3 rises, the flow rate of the cooling medium is automatically regulated upwards to increase cooling. In a further possible embodiment the operating time and/or the wear of the welding electrode 3 is monitored and if an adjustable threshold value is exceeded, the welding electrode 3 is automatically replaced by a new, unused welding electrode 3 which is located for example in the receiving chamber or magazine 2B of the electrode holder 2A behind the welding electrode 3. The clamping device 2 according to the invention is suitable for any welding torch 1 which uses a non-consumable welding electrode 3. The end face SF-2C of the end portion 2C and the end face SF-2D of the clamping heat sink 2D in the clamped state of the clamping device 2 together form a coherent large-surface cooling end face KSF. The two end faces SF-2C, SF-2D are preferably so large in size that they remove sufficient heat from the welding electrode 3 during the welding process. They are assisted in this by the cooling medium flowing through or flowing past the clamping heat sink 2D. In a possible embodiment the cooling end face KSF has in addition small cooling ribs projecting forwards which in the clamped state are aligned seamlessly across both end faces SF-2C, SF-2D of the clamping device 2 in the transverse direction perpendicular to the clamped welding electrode 3. The closed, smooth cooling end face KSF offers the additional advantage that it is immediately clearly recognisable by the user how far the electrode tip 3A of the welding electrode 3 projects from the electrode holder 2D. The user can thus make the relevant readjustments by first loosening the clamping device 2 by rotating the back cap 7, then sliding the welding electrode 3 in the longitudinal direction and finally re-clamping the clamping device 2 by bolting the back cap 7 back on.

The invention claimed is:

1. A welding torch using a non-consumable welding electrode comprising:
   an inner tube enclosed by an outer tube; and
   a clamping device for clamping the non-consumable welding electrode, the clamping device including;
      a clamping heat sink; and
      an electrode holder having a receiving chamber extending in a longitudinal direction of the electrode holder for receiving the welding electrode, the receiving chamber, at a forward end of the electrode holder, defining a narrowed clamping region that widens into said receiving chamber, wherein the electrode holder has at said forward end a conical end portion which widens conically towards the forward end and is configured and arranged to be compressed by said clamping heat sink for holding the welding electrode,
   wherein the clamping heat sink in a clamped state of the clamping device is pushed mechanically against a mantle surface of the conical end portion of the electrode holder, so that in the clamped state said forward end of said electrode defines a large-surface cooling end face for cooling the welding electrode,
   wherein the clamping heat sink of the clamping device is configured for cooling a free electrode end of the welding electrode by a cooling fluid, the clamping heat sink defining a fluid chamber through which the cooling fluid flows and which in said clamped state of the clamping device encloses at least a portion of the conical end portion of the electrode holder for cooling the welding electrode inserted therein, and
   wherein a delivery line is provided between the inner tube and the outer tube to deliver the cooling fluid to said clamping heat sink, and a discharge line is provided between the inner tube and the outer tube for discharging cooling fluid.

2. The welding torch according to claim 1, wherein the clamping heat sink of the clamping device is provided to have a cooling fluid flow through it as a liquid coolant.

3. The welding torch according to claim 1, wherein the fluid chamber of said clamping heat sink is delimited by sealing rings.

4. The welding torch according to claim 1, wherein the conical end portion of the electrode holder has six radially arranged clamping jaws separated by six clamping slots, which in the clamped state of the clamping device are configured and arranged to press the conical end portion of the electrode holder onto the welding electrode inserted into the receiving chamber of the electrode holder, and
   wherein the clamping jaws of the conical end portion each have a tapered portion.

5. The welding torch according to claim 1, wherein the welding electrode inserted into the receiving chamber of the electrode holder in a non-clamped state of the clamping device is laterally displaceable in the longitudinal direction within the receiving chamber of the electrode holder manually or by means of an actuator for adjusting a free electrode end of the welding electrode.

6. The welding torch according to claim 1, wherein the conical end portion of the electrode holder has an opening angle of 20° to 45°.

7. The welding torch of claim 6, wherein the opening angle is 30°.

8. The welding torch according to claim 1, wherein the clamping region of the electrode holder is between 4 and 10 mm long.

9. The welding torch according to claim 1, wherein the clamping heat sink of the clamping device is enclosed by a gas nozzle for delivering an inert gas.

10. The welding torch according to claim 1, wherein the electrode holder of the clamping device has a thread in the region of a rear end opposite said forward end.

11. The welding torch according to claim 10, wherein the electrode holder, in whose receiving chamber a welding electrode is inserted from the front, is pulled backwards manually by bolting on a back cap such that the mantle surface of the conical end portion provided at the forward end of the electrode holder is pushed against the clamping heat sink, wherein based on the clamping slots present in the conical end portion of the electrode holder the clamping jaws of the conical end portion of the electrode holder are pressed against the welding electrode inserted into the receiving chamber of the electrode holder, in order to hold the welding electrode centrally and to form the closed annular cooling end face.

12. The welding torch according to claim 10, wherein the clamping heat sink enclosing the electrode holder has a truncated conical opening which encloses the mantle surface of the conical end portion of the electrode holder and has a corresponding opening angle.

13. The welding torch according to claim 1, wherein in the clamped state an end face of the clamping heat sink ends substantially with a forward end face of the conical end portion of the electrode holder in order to form the cooling end face which encloses both end faces.

14. The welding torch according to claim 1, wherein one or more welding electrodes can be inserted from the front or the back through an opening into the receiving chamber of the electrode holder of the clamping device.

* * * * *